United States Patent
Maaradji et al.

(10) Patent No.: US 8,741,016 B2
(45) Date of Patent: Jun. 3, 2014

(54) FILTER DEVICE

(75) Inventors: Yassine Maaradji, Stuttgart (DE); Jens Hähn, Heidelberg (DE); Jan Zink, Viernheim (DE); Joachim Stinzendörfer, Speyer (DE); Stefan Becker, Mannheim (DE); Karlheinz Münkel, Oberderdingen-Flehingen (DE); Michael Wolf, Neunkirchen (DE); Werner Blossey, Benningen (DE); Mario Rieger, Freiberg (DE); Ralf Poh, Neustadt (DE); Josef Rohrmeier, Laberweinting (DE); Thomas Sieber, Marklkofen (DE); Andreas Pelz, Kornwestheim (DE); Rolf Sanders, Clausthal-Zellerfeld (DE); Manfred Winter, Bad Rappenau (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/362,265

(22) Filed: Jan. 31, 2012

(65) Prior Publication Data

US 2012/0198803 A1   Aug. 9, 2012

(30) Foreign Application Priority Data

Jan. 31, 2011   (DE) .................. 10 2011 009 921

(51) Int. Cl.
| | | |
|---|---|---|
| *B01D 59/50* | (2006.01) | |
| *B01D 50/00* | (2006.01) | |
| *B01D 39/14* | (2006.01) | |
| *B01D 39/06* | (2006.01) | |
| *B01D 24/00* | (2006.01) | |
| *B01D 39/00* | (2006.01) | |
| *B01D 46/00* | (2006.01) | |

(52) U.S. Cl.
USPC .................. 55/484; 55/522; 55/523; 55/524

(58) Field of Classification Search
USPC .................................. 55/484, 498, 522–524
See application file for complete search history.

(56) References Cited

U.S. PATENT DOCUMENTS

| | | | | |
|---|---|---|---|---|
| 2,038,071 | A * | 4/1936 | Wilhelm ..................... 96/118 |
| 3,633,343 | A * | 1/1972 | Mark ........................... 96/118 |
| 5,152,890 | A * | 10/1992 | Linnersten ................ 210/315 |
| 5,322,537 | A * | 6/1994 | Nakamura et al. ............. 55/523 |
| 5,674,393 | A * | 10/1997 | Terhune et al. .............. 210/315 |
| 5,820,646 | A * | 10/1998 | Gillingham et al. ........... 55/488 |
| 6,511,599 | B2 * | 1/2003 | Jaroszczyk et al. ........ 210/493.5 |
| 6,641,637 | B2 * | 11/2003 | Kallsen et al. ............... 55/385.3 |
| 7,276,098 | B2 * | 10/2007 | Koslow ........................ 55/385.3 |
| 7,744,758 | B2 * | 6/2010 | Dworatzek et al. ........... 210/235 |
| 7,931,725 | B2 * | 4/2011 | Wydeven et al. ............. 55/498 |
| 8,157,880 | B2 * | 4/2012 | Muenkel ..................... 55/385.3 |
| 8,313,549 | B2 * | 11/2012 | Muenkel ......................... 55/498 |

(Continued)

*Primary Examiner* — Amber Orlando
(74) *Attorney, Agent, or Firm* — James Hasselbeck

(57) ABSTRACT

A filter device has a compact filter made of a filter material that is wound spirally. A star filter that is made of a filter material that has folds arranged in a star shape surrounds the compact filter. The filter device has a cylindrical shape. A fluid to be filtered passes the compact filter in an axial direction and the star filter in a radial direction. The filter device is exchangeable and is mounted in a filter housing such that the compact filter and the star filter have a common raw side and a common clean side that are separated from each other.

14 Claims, 4 Drawing Sheets

(56) References Cited

U.S. PATENT DOCUMENTS

| | | | |
|---|---|---|---|
| 2005/0081712 A1* | 4/2005 | Koslow | 95/90 |
| 2010/0006514 A1* | 1/2010 | Johnson et al. | 210/767 |
| 2010/0115897 A1* | 5/2010 | Krisko et al. | 55/443 |
| 2010/0192530 A1* | 8/2010 | Wydeven et al. | 55/488 |
| 2010/0313533 A1* | 12/2010 | Muenkel | 55/484 |

* cited by examiner

FILTER DEVICE

CROSS REFERENCE TO RELATED APPLICATIONS

This application claims the benefit under 35 USC 119 of foreign application DE 102011009921.2 filed in Germany on Jan. 31, 2011, and which is hereby incorporated by reference in its entirety.

TECHNICAL FIELD

The invention relates to a filter device for filtering fluids, in particular for intake air, fuel, urea-water solutions or lubricant oil for internal combustion engines in motor vehicles.

BACKGROUND OF THE INVENTION

Filters that comprise spirally wound filter materials are known in the prior art. For the filtration of air, so-called compact filters are commonly used that are in particular formed of layered filter paper. A corrugated filter paper web is applied onto a flat filter paper web. The thus formed semi-finished product is wound to a filter body or stacked so that a plurality of gas passages that extend parallel to each other are formed. These gas passages are alternatingly closed off by plugs. Incoming air passes axially, parallel to the winding axis, from the raw side (unfiltered fluid side) into the gas passages open at the inlet side and is forced by means of the plugs at the exit side to pass through the filter walls into the neighboring gas passages. From here the filtered air exits through the gas passages open at the exit side to the clean (filtered fluid) side the filter.

WO 2007/035802 A1 discloses a filter and a method for producing such a filter. The filter is produced by winding a web-shaped filter medium. The filter medium is formed of a flat filter medium web and a corrugated filter medium web. Such filters may exhibit a high pressure loss in particular when under great load. Moreover, filters with folds of a filter medium arranged in a star shape are disclosed, for example, in EP 1 191 994 B1. Such filters, however, have a relatively large size and require a lot of mounting space.

SUMMARY OF THE INVENTION

It is therefore an object of the present invention to provide a filter device that has a filter action that is as high as possible and a pressure loss that is as minimal as possible and that requires only minimal space.

In accordance with the present invention, this is achieved by a filter device for intake air that comprises a compact filter with a spirally wound filter material and a star filter surrounding the compact filter and formed by folds that are arranged in a star shape. The compact filter that comprises a spirally wound filter material has preferably a flat layer of filter medium or filter material and a corrugated layer of filter medium or filter material placed on the flat layer wherein, between the flat layer and the corrugated layer, individual flow passages are produced that are closed off alternatingly.

As a filter material or filter medium preferably filter paper and/or a nonwoven is suitable, optionally with a coating of thin fibers, for example, meltblown fibers, with an average diameter of 2 µm or nano fibers with a smaller average diameter, for example, in the range of 50 nm to 500 nm.

In particular, the filter device has a high filtering effect wherein the compact filter may have the greater filtering effect in comparison to the star filter, for example, with respect to the degree of separation and/or dust capacity. Even though the filtering effect of the compact filter is generally greater than that of the star filter, the star filter in comparison to the compact filter has usually the smaller pressure loss. Accordingly, the filter device, as a whole, has a comparatively high filtering effect while it exhibits simultaneously a minimal pressure loss and provides an optimal mounting space utilization.

The filter device can be used for filtering air that has been taken in from the environment and that is supplied to an internal combustion engine. Basically, however, other applications are also conceivable, for example, filtering air for the passenger compartment of a motor vehicle or filtering fuel, urea-water solutions or lubricant oil for internal combustion engines, in particular for motor vehicles.

Between the compact filter and the star filter a tube (central tube) provided with penetrations can be arranged coaxially to the compact filter and to the star filter. The star filter can rest against the tube so that it supports the star filter and provides it with the desired shape stability. This can be particularly advantageous when the star filter has a greater length than the compact filter and thus projects past it with sections thereof.

In a preferred embodiment, the compact filter is seal-tightly connected to the star filter in such a way that a common raw (unfiltered fluid) side and a common clean (filtered fluid) side are formed. The connection can be detachable or non-detachable. In this context, preferably the radial outer surface of the compact filter can be seal-tightly connected to a first terminal sealing surface (terminal disk) of the star filter. The seal-tight connection can be, for example, achieved also in that the compact filter is pressed into an elastic sealing surface. Moreover, it is possible to generate the sealing surface by a potting compound of polyurethane wherein the end face of the star filter and the rim of the compact filter, optionally together with a central tube, are embedded in the potting compound. The compact filter can also be glued to the star filter wherein in particular a connection with the central tube is expedient. Also, a plug-in connection is possible.

The compact filter can be flowed through in axial direction by the air while the star filter can be flowed through in radial direction by the air. Accordingly, the filter device can be flowed through in axial and radial directions by the air. In this way, the flowed-through filter surface area can be maximized in the filter device.

Preferably, the compact filter and the star filter can be arranged coaxially to each other. The filter device can have a cylindrical shape that is of rotational symmetry or oval.

In one embodiment, the radial outer surface of the compact filter is spaced from the radial inner surface of the star filter in such a way that an unhindered flow passage through the star filter is enabled. In case of liquid filters, depending on the viscosity of the liquid, a few millimeters (e.g. >2 mm) may be sufficient while for gas filters the spacing between the filters is preferably at least one cm, especially preferred at least 2 cm.

Expediently, the compact filter and the star filter each can have different lengths. When the star filter is longer than the compact filter, this is beneficial with respect to reduction of pressure losses.

In an especially preferred embodiment, the star filter can taper conically so that it can be adjusted appropriately to certain mounting conditions.

A secondary filter can be arranged in the flow direction downstream of the compact filter. The secondary filter can improve efficiently the filter action of the filter device. It can maintain also the filtering action when the compact filter and/or the star filter are to be exchanged. The secondary filter can be preferably a star filter.

The filter device can be mounted in a housing embodied to receive it. So that between the housing and the filter device no air that is to be filtered or has already been filtered can escape, the filter device can have at its end faces a sealing surface with which the filter device contacts, and rests against, the housing.

Expediently, the compact filter and the star filter can be made of nonwoven. The nonwoven can be, for example, produced of nanofibers of cellulose.

The compact filter and the star filter can be detachably or non-detachably connected to each other. This can be realized, for example, by a connection between a tube and an annular sealing surface wherein the tube is arranged between the star filter and the compact filter and the sealing surface at the end faces of the filter device. The sealing surface may be elastomeric for forming a seal-tight seal.

The invention concerns moreover a filter system, comprising a filter device with a compact filter comprising a spirally wound filter material and a star filter surrounding the compact filter and formed of folds arranged in a star shape wherein the filter device is installed as an exchangeable filter element in the filter housing. In this connection, the filter device is mounted in such a way seal-tightly in the filter housing that the raw (unfiltered fluid) side is separated from the clean (filtered fluid) side. The fluid to be filtered passes through an inlet into the housing and loads the compact filter and the star filter, respectively, at the common raw side, passes through the two filters to the common clean side, and is guided through an outlet opening out of the housing.

The filter device is preferably seal-tightly mounted in such a way in the housing that the second terminal sealing surface of the star filter which is opposite the first terminal sealing surface that comprises a seal-tight connection to the compact filter, is seal-tightly connected to the outlet opening. In this connection, the second terminal surface can engage the filter housing by means of an inner or outer radial seal or by means of an axial seal.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
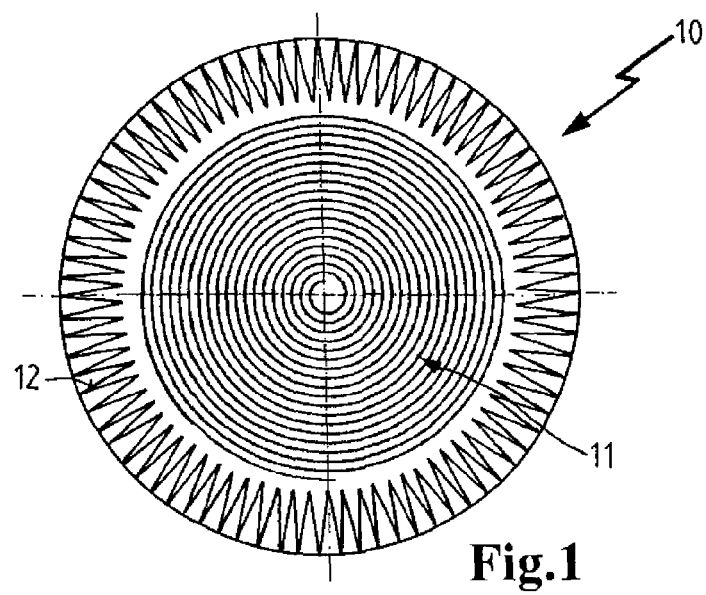
FIG. 1 shows a plan view of a first embodiment of a filter device, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter device. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The terminology used herein is for the purpose of describing particular example embodiments only and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 2:
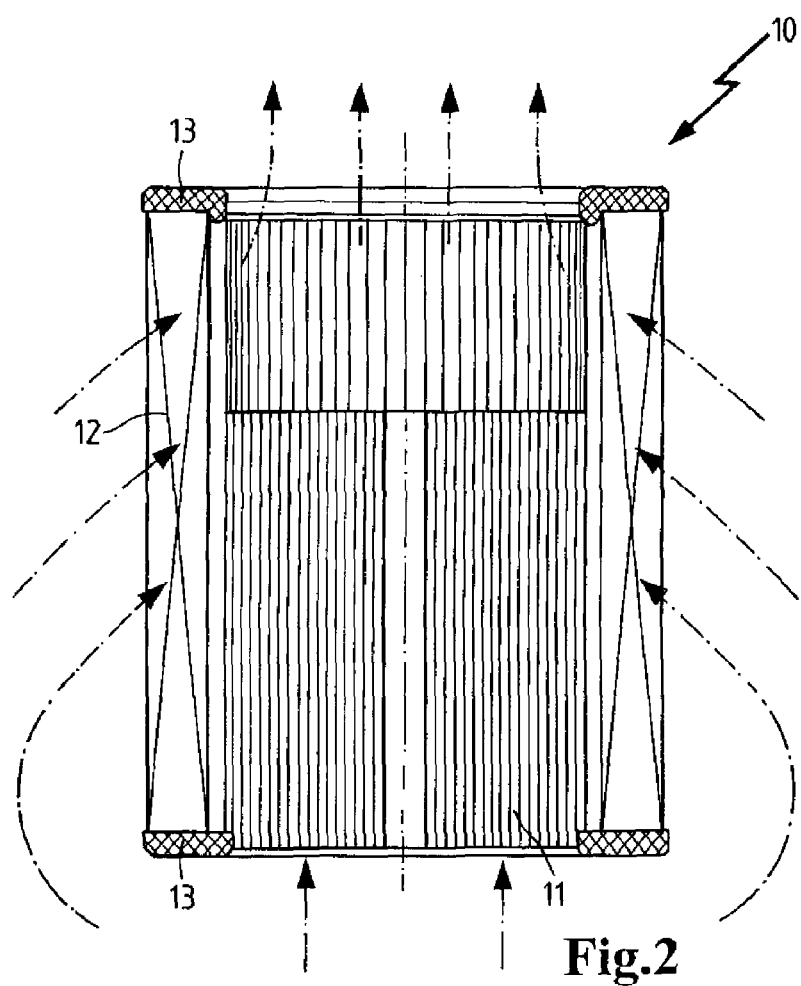
FIG. 2 shows a longitudinal section of the filter device according to FIG. 1.

FIGS. 1 and 2 show a filter device 10 with a compact filter 11 comprising a spirally wound filter material and with a star filter 12 formed of folds arranged in a star shape. The filter device 10 has a rotation-symmetrical cylindrical shape. The star filter 12 is arranged coaxially to the compact filter 11 wherein the star filter 12 is longer than the compact filter 11 so that the star filter 12 projects past the compact filter 11 in the upper area.

Air to be filtered can enter the star filter 12 from below in radial direction as well as enter the compact filter 11 in axial direction from below. The filtered air exits the star filter 12 in radial direction toward the central axis of the filter device 10 and is subsequently discharged upwardly out of the filter device 10. The air passing through the compact filter 11 is discharged in axial direction upwardly from the filter device. As a result of the spirally wound filter material the compact filter 11 has a high filtering effect while the star filter 12 exhibits a relatively minimal pressure loss. In this way, the filter device 10 combines the advantages of the compact filter 11 and of the star filter 12. The fact that the star filter 12 projects past the compact filter 11 in the upper area has an additional positive effect with respect to minimal pressure loss of the filter device 10.

At the end faces of the filter device 10 circumferentially extending sealing surfaces 13 are provided. By means of the sealing surfaces 13, the filter device 10 can contact, and rest against, a housing (not illustrated). Accordingly, the sealing surfaces 13 ensure that the air cannot escape in an undesirable fashion between the filter device 10 and the housing.

Figure 3:
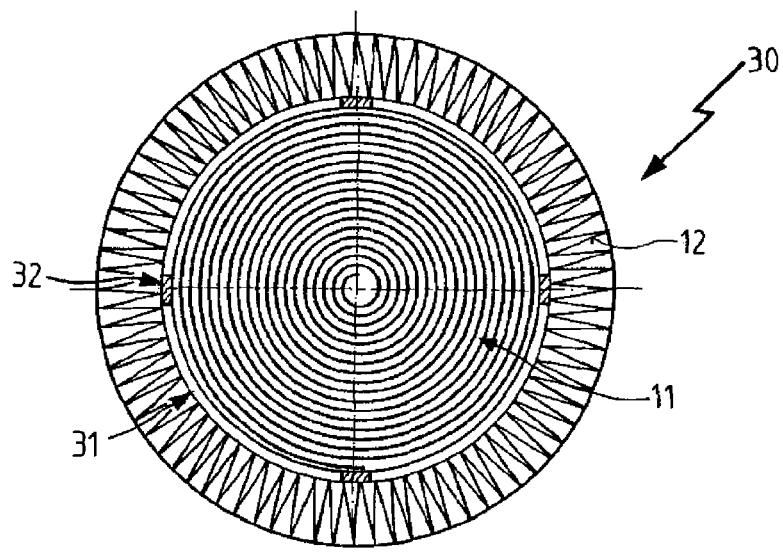
FIG. 3 is a plan view of a second embodiment of the filter device, consistent with the present invention.
Figure 4:
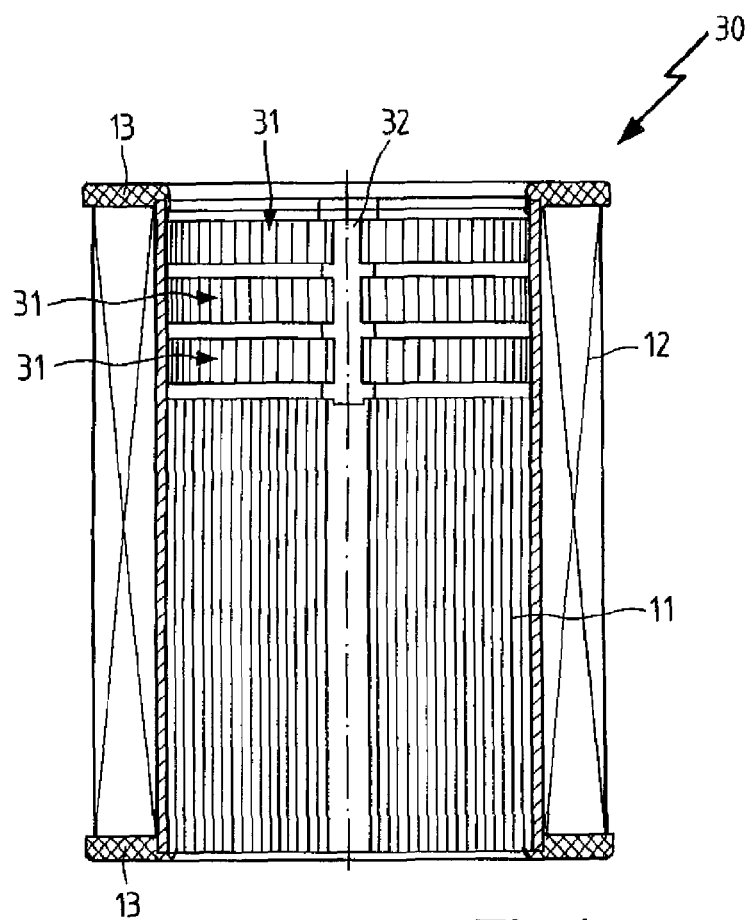
FIG. 4 is a longitudinal section of the filter device of FIG. 3.

FIGS. 3 and 4 show a filter device 30 in which between the star filter 12 and the compact filter 11 a tube 32 provided with penetrations 31 extending from a radial exterior to a radial interior of the tube 32 for radial fluid flow through the tube 32. As a result of the penetrations 31 the tube 32 has a grid-shaped structure. The tube 32 supports the star filter 12 which, in operation, may be forced in radial direction inwardly by the air that is passing through the star filter 12. In particular in the upper area of the filter device 30 where the star filter 12 projects past the compact filter 11 the tube 32 imparts the desired shape stability to the star filter 12. The penetrations 31 are as large as possible so that the pressure loss despite the presence of the tube 32 remains substantially unchanged.

In a filter device 50 (see FIGS. 5 and 6) in the upper area in which the star filter 12 projects past the compact filter 11, a secondary filter 51 is inserted. The secondary filter 51 can additionally improve the filtering action of the filter device 50. Moreover, it can also maintain the filtering action when the compact filter 11 and/or the star filter 12 are exchanged.

Figure 5:
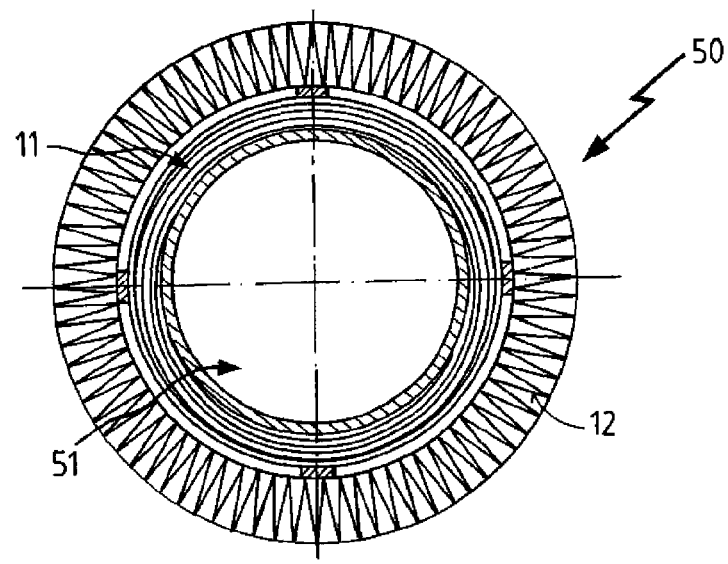
FIG. 5 is a plan view of a third embodiment of the filter device, consistent with the present invention.
Figure 6:
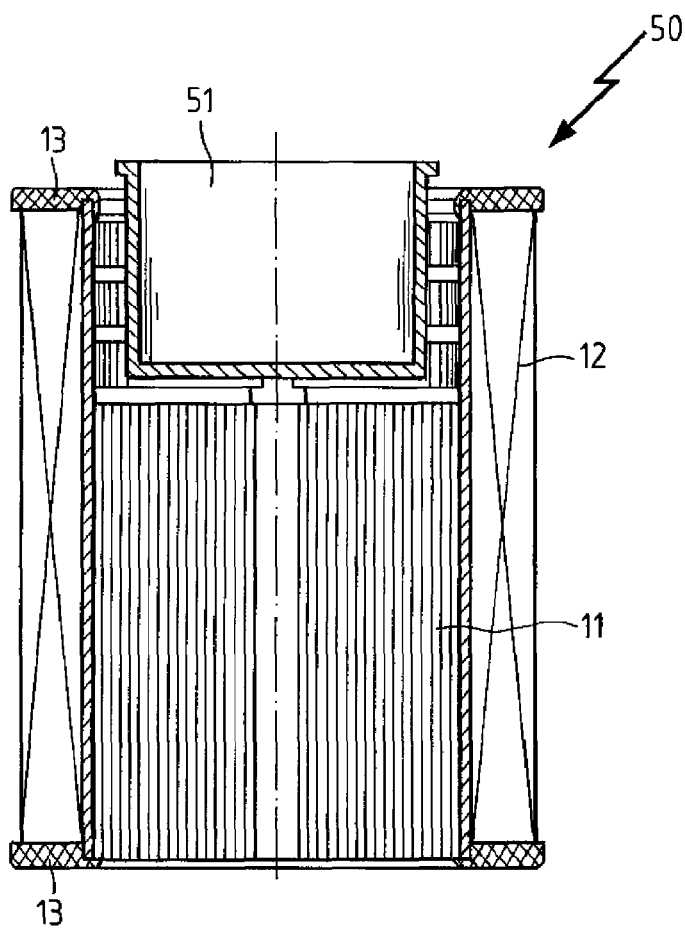
FIG. 6 is a longitudinal section of the filter device of FIG. 5.
Figure 7:
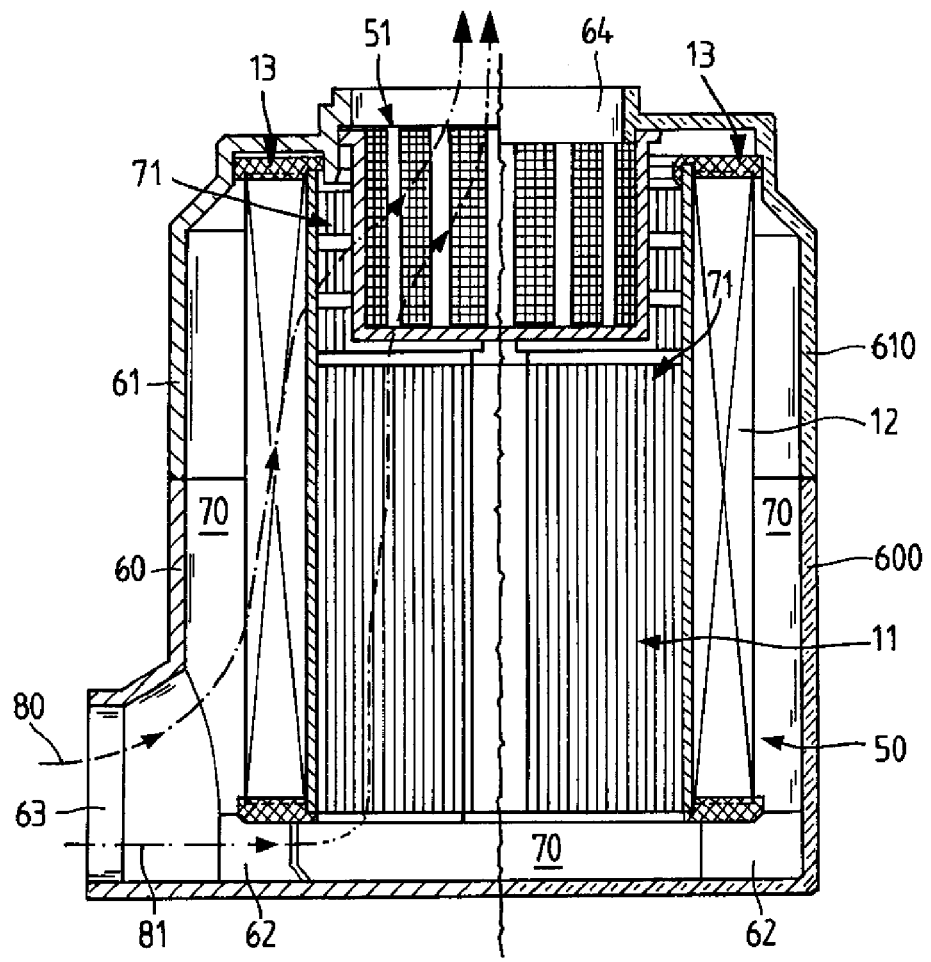
FIG. 7 is a longitudinal section of the filter device of FIG. 5 mounted in the filter housing.

The installation of the filter device of FIGS. 5, 6 is illustrated in FIG. 7 wherein two variants of the connection between the filter housing 60, 61, 600, 610 and filter device is illustrated. On the left side, the separable housing halves 60 and 61 are shown. In the upper housing half 61, the star filter 12 is seal-tightly connected in the area of the outlet opening 64 in radial direction inwardly with the housing so that the raw side 70 is separated from the clean side 71. On the right side, an embodiment is illustrated where the sealing action is realized between the radial outer side of the terminal sealing surface 13 and the housing half 610.

In both variants the secondary filter 51 is arranged on the clean side 71 and is connected seal-tightly with the outlet opening 64 of the housing 61, 610. The filter device 50 in the area of the lower housing half 60, 600 is secured by a holding device that allows incoming flow to enter the compact filter 11 and the star filter 12. This can be realized, for example, by holding webs 62 as illustrated in FIG. 7 that project axially from the housing bottom and about which the incoming fluid can flow in the direction of arrows 80, 81. The fluid to be filtered passes through the inlet opening 63 into the filter housing and flows about the filter device 50 at the raw side wherein the fluid to be purified (schematically indicated by the arrows 80, 81) flows in direction of arrow 80 into the star filter 12 and in the direction of arrow 81 through the passages of the compact filter 11 to the clean side 71. At the clean side 71, the flows are combined, pass through the secondary filter 51, and are discharged through the outlet opening 64.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter device filtering a fluid, the filtering device comprising:
   an inlet flow face at a first axial end of said filter device;
   an outlet flow face at an opposing second axial end of said filter device;
   a spirally wound compact filter comprising
   a corrugated filter material layer;
   a flat filter material layer overlaid onto said corrugated filter material layer,
   wherein said corrugated and flat layers are spirally wound about a central axis of the filter device providing a spirally wound filter body having an inlet flow face on a raw side of said spirally wound filter body and an axially opposing outlet flow face on a clean side of said spirally wound filter body, axially opposing in a direction of said central axis,
   wherein said wound filter body has a plurality of axially extending gas flow passages extending in between said raw and clean sides,
   wherein said gas flow passages are alternatingly closed off,
   wherein fluid flows axially within said compact filter element from said inlet flow face of said spirally wound filter body to said outlet flow face of said spirally wound filter body in said direction of said central axis;

a star filter comprising
a filter material having folds arranged into a star shape, wherein said star filter radially and circumferentially surrounds said compact filter, said spirally wound compact filter arranged within an interior of said star filter;
wherein said folds extend in the direction of the central axis between opposing axial ends of said star filter,
wherein said compact filter and said start filter are arranged to filter in parallel, each filtering a different portion of said fluid to be filtered;
a circumferentially extending first terminal sealing surface arranged on a first one of said flow faces of said filter device, said first terminal sealing surface secured onto and seal-tightly covering an axial end face of filter material folds of said star filter from a radially outer flow face of said star filter to a radially inner flow face of said star filter;
wherein said first terminal sealing surface extends radially inwardly relative to said central axis from said radially inner flow face of said star filter to terminate at and seal against a radial outer surface of the spirally wound filter body;
wherein the axially opposed flow faces of the spirally wound filter body remain uncovered by the first terminal sealing surface;
wherein a first portion of said fluid to be filtered enters said spirally wound compact filter at said axial raw side of said compact filter, flowing axially through said gas flow passages to exit said spirally wound compact filter at said axially opposed clean side at a radially interior clean side at an interior of said star filter,
wherein a different second portion of said fluid to be filtered enters a radially outer face of said star filter, flows radially inwardly through said star filter material folds and exits said star filter at said radially interior clean side at an interior of said star filter.

2. The filter device according to claim 1, wherein said filter device is cylindrical.

3. The filter device according to claim 1, wherein
said compact filter has a first axial length defined by an axial distance between said compact filter element raw and clean sides,
wherein said star filter has a second axial length defined by an axial distance between said opposing axial ends of said star filter,
wherein said first and second axial lengths are different.

4. The filter device according to claim 1, comprising
an axially extending tube provided with fluid flow penetrations in a circumferential wall of said tube extending between an exterior into an interior of said tube,
said tube arranged coaxially between said compact filter and said star filter.

5. The filter device according to claim 1,
wherein fluid filtered by said compact and said star filter element flow in a filtered fluid direction to exit said filter device,
wherein said filter device further comprises
a secondary filter arranged downstream of said compact and star filter elements,
wherein said secondary filter receives both said first portion of said fluid to be filtered from said spirally wound compact filter and receives said second portion of said fluid to be filtered from said star filter,
wherein said filtered fluid is constrained to flow through said secondary filter to exit said filter device.

6. The filter device according to claim 1, comprising
axially opposing filter device end faces between which said compact filter and said star filter are arranged,
wherein each of said filter device end faces is provided with a sealing surface.

7. The filter device according to claim 1, wherein
said filter material of said compact filter is a nonwoven; and
said filter material of said star filter is a nonwoven.

8. The filter device according to claim 1, wherein
said compact filter and said star filter are connected to each other such that said compact filter and said star filter have a common raw side and a common clean side.

9. The filter device according to claim 8, wherein
said compact filter and said star filter are detachably connected to each other.

10. The filter device according to claim 8, wherein
said compact filter and said star filter are non-detachably connected to each other.

11. The filter device according to claim 1 as an intake air filter for an internal combustion engine.

12. A filter system comprising:
a filter device according to claim 1;
a filter housing;
wherein said filter device is exchangeably and replaceably installed into an interior of said filter housing,
said filter device mounted seal-tightly in said filter housing such that said compact filter and said star filter have a common raw side and a common clean side that are separated from each other.

13. The filter device according to claim 5, wherein
said spirally wound compact filter has a first axial length defined by an axial distance between said compact filter element raw and clean sides,
wherein said star filter has a second axial length defined by an axial distance between said opposing axial ends of said star filter,
wherein said first and second axial lengths are different,
wherein said secondary filter protrudes into said interior of said star filter at said clean side of said star filter.

14. The filter device according to claim 13, wherein
a radial outer surface of said spirally wound compact filter is seal-tightly connected to one of said terminal sealing surfaces at said inlet flow face of said filter device.

* * * * *